Jan. 25, 1927.
J. F. JEFFERS
1,615,703
SAW GUIDE
Filed Sept. 28 1925     2 Sheets-Sheet 1
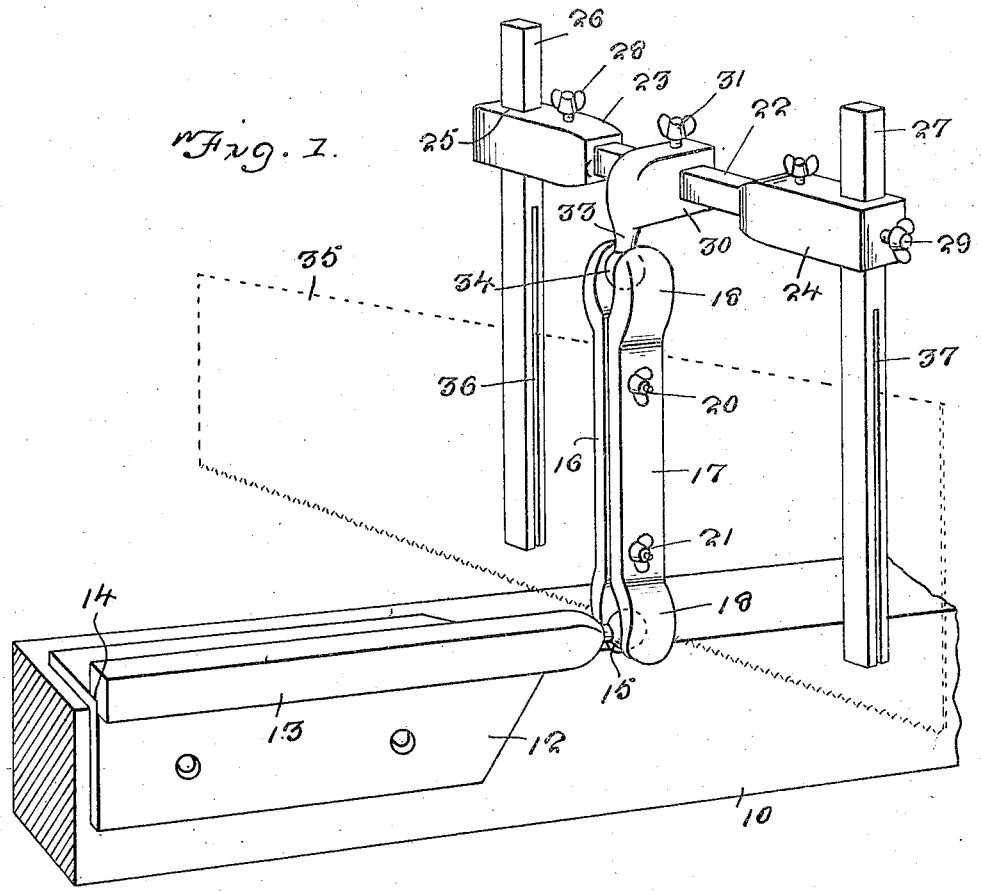
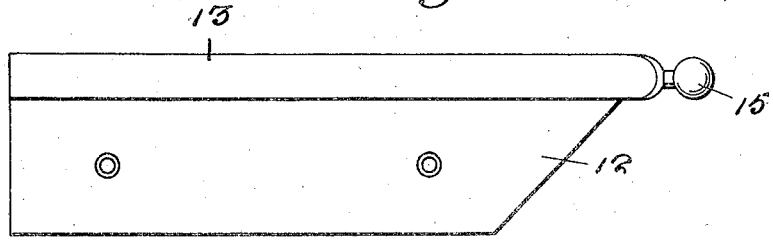
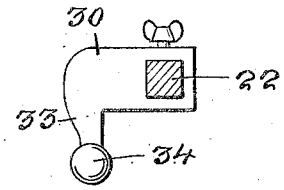
J. F. Jeffers
INVENTOR
BY Victor J. Evans
ATTORNEY
WITNESS:

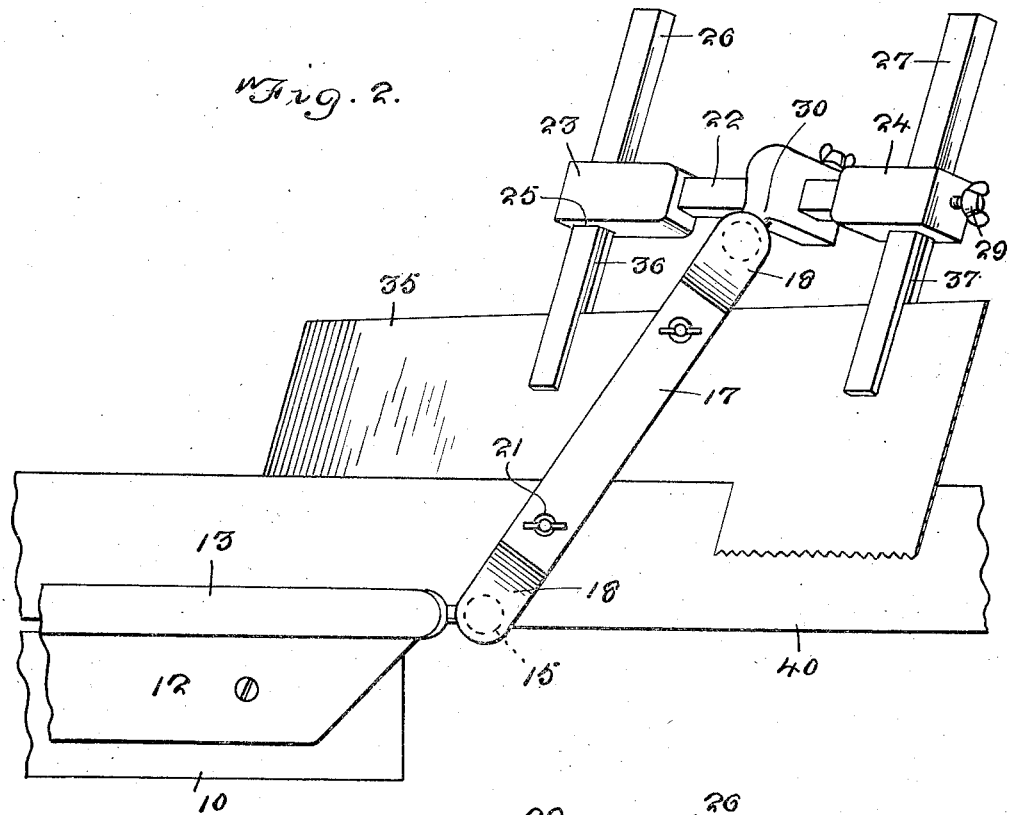

Patented Jan. 25, 1927.

1,615,703

UNITED STATES PATENT OFFICE.

JOHN F. JEFFERS, OF BURBANK, CALIFORNIA.

SAW GUIDE.

Application filed September 28, 1925. Serial No. 59,177.

The object of this invention is to provide a device which may be applied to any convenient supporting element having a straight edge, and which shall include a plurality of saw blade guiding elements, with means for setting these elements at a specified angle with reference to the straight edge, so that a board, rafter or other timber may be accurately cut at any angle required.

A further object is to provide, in such a device, an element of angle bar construction, adapted to be placed on a support having a straight edge and to be connected therewith, a bar adapted to mount saw guiding elements, and a clamping device for connecting this bar with the angle element, in such manner that the saw guiding elements will be held at any desired angle.

A further object is to provide a device which is easily carried with other tools, and when made in different sizes, is suitable for use under a great variety of conditions, for making angle cuts.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1 is a perspective view of the device as applied to a supporting element having a straight edge, the position of the saw blade being shown in dotted lines.

Figure 2 is a perspective view showing the device in position for making an angle cut in a timber, the latter being in elevation.

Figure 3 is a view of the device per se, looking from the upper side of Figure 2.

Figure 4 is a detail view of the element to be applied to the supporting member.

Figure 5 is a detail view of the bracket which is applied to the upper transverse bar of Figure 1.

In Figures 1 and 2, a supporting element on which the angle member may be mounted, is designated 10, and the angle member forming a part of the tool is designated 12. This device may be of commercial angle bar type, and has connected therewith, or if preferred, formed thereon, a bar 13 approximately square in cross section but cut away at 14 in order to effect the connection illustrated at the left of Figure 1 in the event that elements 12 and 13 are secured by riveting.

A head 15 is formed on bar 13, and this element 15 is illustrated as being of spherical form, in order to provide a practical universal joint between bar 13 and a standard comprising bars or plates 16 and 17, each having a deflected portion 18 at opposite ends. The deflected portions are provided with concaved inner surfaces 19 cooperating with the head 15 in the manner illustrated in Figure 1 and further shown in Figure 3.

Bolts or screws 20 pass through bars 16 and 17 and are each retained by a wing nut such as 21, in order to provide a type of clamp, so that the saw guiding elements referred to below may be properly held with reference to the mounting element 12.

An upper transverse bar 22 is preferably of rectangular cross section and each end of this bar carries a block or the like 23 or 24, as the case may be, these blocks being provided with square openings 25 through which bars 26 and 27 project perpendicularly with reference to transverse bar 22 and the blocks 23 and 24. Set screws or clamping devices such as 28 and 29 are located at the points shown, and serve to clamp the movable elements with reference to each other after an adjustment has been secured.

A central bracket 30 is provided with a square opening through which bar 22 passes, and a clamping device 31 is located as shown in this bracket in order to secure the latter against sliding movement with reference to bar 22.

Bracket 30 is provided with an extension 33 carrying a head 34 of spherical form and adapted to cooperate with the concaved portions at the upper ends of bars 16 and 17. It will therefore be observed that the standard comprising elements 16 and 17 is not only movable in various directions with reference to mounting device 12 and its bar 13, but the upper bar 22 and bars 26 and 27 are also movable with reference to the standard, and likewise in various directions. Any angular adjustment desired for bars 26 and 27 is therefore possible.

A saw blade is designated 35, and this blade is guided by slots 36 and 37 in bars 26 and 27, so that when the adjustable devices have been placed in the position desired to make a cut at a given angle, the saw operating in slots 36 and 37 is handled in the usual manner, and a cut may be made at an angle with one surface of the stock 40, or at an angle with two adjacent surfaces thereof.

Having thus described the invention, what is claimed as new, is:—

1. In a device of the class described, saw guiding means, a transverse arm for mounting said means, a bracket carried by the arm, a standard, with reference to which the bracket is movable to various angles, and means for adjustably mounting the standard, said means comprising an element formed with flanges at an angle with each other and including a spherical projecting portion, for engagement by said standard.

2. In a device of the class described, saw guiding means, a transverse arm for mounting said means, a bracket carried by the arm, a standard, with reference to which the bracket is movable to various angles, and means for adjustably mounting the standard with reference to a supporting element, said standard comprising a plurality of clamping elements having their opposite ends socketed, the sockets at adjacent ends being in opposed relation, and adapted to receive projecting portions of the bracket and supporting element, respectively.

3. In a device of the class described, saw guiding means, a transverse arm adjustably mounting said means, a bracket adjustably mounted on the transverse arm, a two-part socketed clamping device constituting a standard for mounting the bracket, and a spherical supporting element with reference to which the standard is movable in various directions.

4. In a device of the class described, a supporting element including a rounded head, a socketed standard connected with the head and comprising a pair of jaws, a bracket with which the standard is connected, a bar adjustably mounted in the bracket, and saw guiding bars adjustably carried by the bar first named.

In testimony whereof I affix my signature.

JOHN F. JEFFERS.